US010787074B2

(12) United States Patent
Hayashi

(10) Patent No.: US 10,787,074 B2
(45) Date of Patent: Sep. 29, 2020

(54) VEHICLE

(71) Applicant: Yamaha Hatsudoki Kabushiki Kaisha, Shizuoka-ken (JP)

(72) Inventor: Tomoyuki Hayashi, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 184 days.

(21) Appl. No.: 15/836,914

(22) Filed: Dec. 11, 2017

(65) Prior Publication Data
US 2018/0170178 A1 Jun. 21, 2018

Related U.S. Application Data

(60) Provisional application No. 62/434,417, filed on Dec. 15, 2016.

(51) Int. Cl.
*B60K 26/04* (2006.01)
*B60K 26/02* (2006.01)
*G05G 1/38* (2008.04)

(52) U.S. Cl.
CPC .............. *B60K 26/04* (2013.01); *B60K 26/02* (2013.01); *G05G 1/38* (2013.01); *B60K 2026/046* (2013.01); *B60W 2540/10* (2013.01); *B60W 2710/0605* (2013.01); *B60Y 2200/124* (2013.01); *Y10T 74/20534* (2015.01)

(58) Field of Classification Search
CPC .. B60K 26/04; B60K 26/02; B60K 2026/046; B60W 2710/0605; B60W 2540/10; B60Y 2200/124; G05G 1/38; Y10T 74/20534

USPC ............................................ 180/335; 74/513
See application file for complete search history.

(56) References Cited

U.S. PATENT DOCUMENTS

| | | | | |
|---|---|---|---|---|
| 6,460,421 | B1* | 10/2002 | Hasegawa | F02D 1/045 73/862.29 |
| 8,464,824 | B1 | 6/2013 | Reisenberger | |
| D769,163 | S * | 10/2016 | Platto | D12/196 |
| 2010/0078256 | A1* | 4/2010 | Kuwabara | B60K 5/02 180/337 |
| 2014/0067215 | A1* | 3/2014 | Wetterlund | B60K 26/02 701/69 |
| 2016/0196800 | A1* | 7/2016 | Kim | G09G 5/14 715/771 |
| 2017/0203661 | A1* | 7/2017 | Nishinaka | B60L 11/1816 |
| 2018/0051496 | A1* | 2/2018 | Konchan | E05B 79/20 |

FOREIGN PATENT DOCUMENTS

JP 63266136 A * 11/1988

* cited by examiner

*Primary Examiner* — Keith J Frisby
(74) *Attorney, Agent, or Firm* — HEA Law PLLC

(57) ABSTRACT

An accelerator pedal is located forward of the driver seat. The accelerator pedal is supported by a bracket and is movable by stepping on than accelerator pedal. An accelerator position, sensor is located higher than the bracket and detects a deflection amount of the accelerator pedal. A wire connects the accelerator pedal and the accelerator position sensor to each other. The vehicle can prevent the accelerator position sensor from being splashed with mud and water.

17 Claims, 7 Drawing Sheets

VEHICLE

CROSS-REFERENCE TO RELATED APPLICATION

The present application, claims priority from U.S. provisional patent application 62/434,417 filed on Dec. 15, 2016, the content of which is hereby incorporated by reference into this application.

FIELD OF THE INVENTION

The present specification relates to technologies of four-wheel vehicles.

BACKGROUND OF THE INVENTION

In conventional vehicles that are frequently used in rough terrain, the accelerator pedal and the throttle valve that adjusts the amount of air to be supplied to ten engine are connected by a wire. The connection through the wire effects a one to one correspondence between a position of the accelerator pedal and an opening amount of the throttle valve. This structure requires frequent operations of the accelerator pedal by the driver, for example, when the vehicle runs in an undulating place. This causes inconvenience while driving the vehicle. In order to reduce the inconvenience, an electronic throttle control system that actuates the throttle valve with an actuator is effective. U.S. Pat. No. 8,464,824 discloses a vehicle having an electronic throttle control system. In the vehicle disclosed in the patent document, a sensor (an accelerator position sensor) that detects an amount (accelerator pedal position) of stepping on the accelerator pedal is attached to the accelerator pedal.

SUMMARY OF THE INVENTION

Vehicles that are frequently used in rough terrain sometimes enter puddles, rivers, muddy areas, or the like. In the vehicle of the patent document mentioned above, the accelerator, position sensor is attached to the accelerator pedal. Therefore, there is a possibility that the sensor is splashed with water or mud.

An objection of the present disclosure is to provide a vehicle that is able to reduce the possibility that the sensor is splashed with water or mud.

(1) An embodiment of a vehicle according to the present disclosure comprises; right and left front wheels; right and left rear wheels; a driver seat; an accelerator pedal located forward of the driver seat; a bracket supporting the accelerator pedal so that the accelerator pedal is movable by stepping thereon; an accelerator position sensor that is located higher than the bracket and detects an amount of deflection when the accelerator pedal is pressed; and a wire connecting the accelerator pedal and the accelerator position sensor to each other. This embodiment can reduce the possibility that the sensor is splashed with water or mud.

(2) In the embodiment described in part (1), the accelerator position sensor may be located higher than a lower surface of the driver seat. This embodiment can prevent the accelerator position sensor from being splashed with water or mud, for example, even when a lower portion of the vehicle is immersed in water.

(3) In the embodiment described in part (1), the accelerator position sensor may be located forward of the driver seat. This embodiment can prevent the distance between the accelerator position sensor and the accelerator pedal from becoming excessively large.

(4) The embodiment described in part (3), may further comprise a plate member located under the accelerator position sensor. This embodiment can effectively reduce the possibility that the sensor is splashed with water or mud.

(5) The embodiment described in part (4), may further comprise a dashboard located forward of the driver seat, wherein the plate member may be a part of the dashboard. This embodiment enables the number of parts to be reduced.

(6) The embodiment described in part (1) may further comprise an engine, wherein the accelerator position sensor may be located higher than a lower end of the engine.

(7) The embodiment described in part (1) may further comprise a controller that controls an engine, wherein the accelerator position sensor and the controller may be located between the right and left front wheels. This embodiment can prevent the distance between the accelerator position sensor and the controller from being large.

(8) The embodiment described in part (1) may further comprise a front cover located between the right and left front wheels and covering an upper side of the vehicle body frame, wherein the accelerator position sensor may be located under the front cover.

(9) The embodiment described in part (1) may further comprise an induction system that includes an air intake that intakes the atmospheric air, and carries the intaken atmospheric air to an engine, wherein the accelerator position sensor may be located at the same height as the air intake or located higher than the air intake. This embodiment can effectively prevent the accelerator position sensor from being splashed with water or mud.

(10) The embodiment described in part (1) may further comprise an electric motor located further forward than the driver seat in a side view of the vehicle, wherein the accelerator position sensor may be located on an opposite side to the electric motor across a center of the vehicle body in a right-left direction. This embodiment can reduce influence on the accelerator position sensor from the magnetic field formed by the electric motor.

(11) In the embodiment described in part (1), the accelerator position sensor may be located on an opposite side to a steering wheel across a center of the vehicle body in a right-left direction. This embodiment enables a steering assist system including an electric motor to be used while reducing influence on the accelerator position sensor from the magnetic field formed by the electric motor.

(12) The embodiment described in part (1) may further comprise a radiator disposed in a front portion of a vehicle body, wherein the accelerator position sensor may be located further rearward than the radiator. This embodiment can reduce influence on the accelerator position sensor from a magnetic field formed by an electric motor that drives a fan of the radiator.

In the embodiment described in part (12), the radiator may be located forward of a center in the front-rear direction of a front portion of a frame supporting the front wheels, and the accelerator position sensor may be located rearward from the center. This embodiment can further reduce influence on the accelerator position sensor from a magnetic field formed by the electric motor that drives the fan of the radiator.

(13) The embodiment described in part (1) may further comprise a roll cage covering the driver seat.

(14) The embodiment described in part (1) may further comprise an engine, wherein the driver seat comprises a seat bottom including a seat surface facing upward, and at least a portion of the engine is located lower than the seat bottom.

(15) The embodiment described in part (1) may further comprise an engine, wherein the engine is located between the driver seat and a passenger seat located next to the driver seat.

DETAILED DESCRIPTION OF THE INVENTION

Hereinafter, embodiments according to the present invention will be described. The embodiments disclosed in the present specification should be understood as an example of the invention and the invention is not limited to embodiments described in the following description and in the figures. Other embodiments having advantages that is the same as, or similar to, advantages of the present embodiments are included within the scope of the present invention.

Various techniques and structures are described in this specification. Those may be combined with other techniques and structures described herein. Though the present specification does not describe all possible combinations, any combinations are within the scope of the present invention.

Unless otherwise defined, all terms used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the content clearly indicates otherwise. It will be further understood that the terms "comprises" "comprising" "includes" and "including" when used in this specification, specify the presence of stated features, operations, elements, and/or components, but preclude the presence or addition of one or more other features, operations, elements, components, and/or groups thereof.

Figure 1:
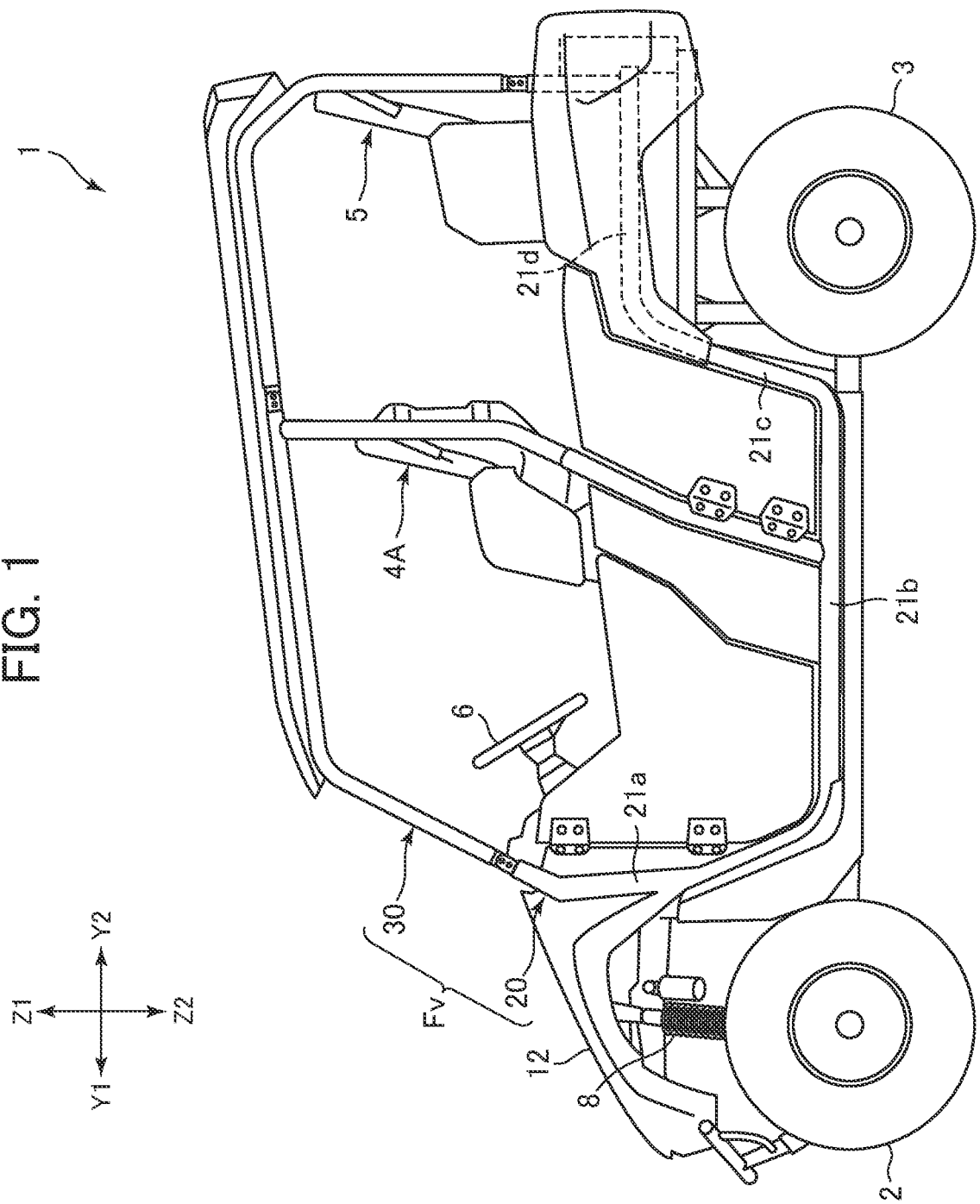
FIG. 1 is a side view of a vehicle which is an example of the embodiments according to the present disclosure.
Figure 2:
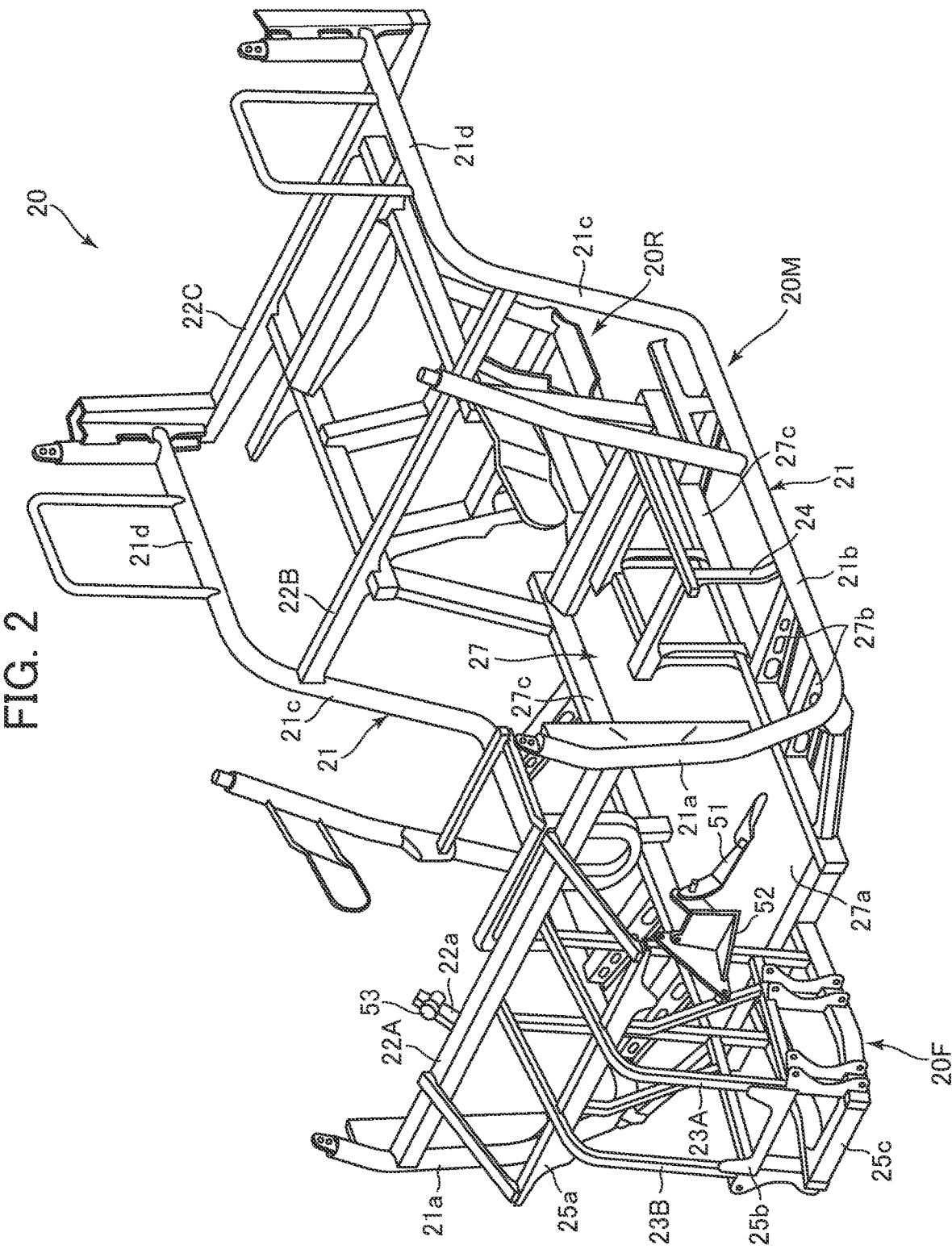
FIG. 2 is a perspective view of a main frame which is a lower part of the vehicle body frame of the vehicle.
Figure 3:
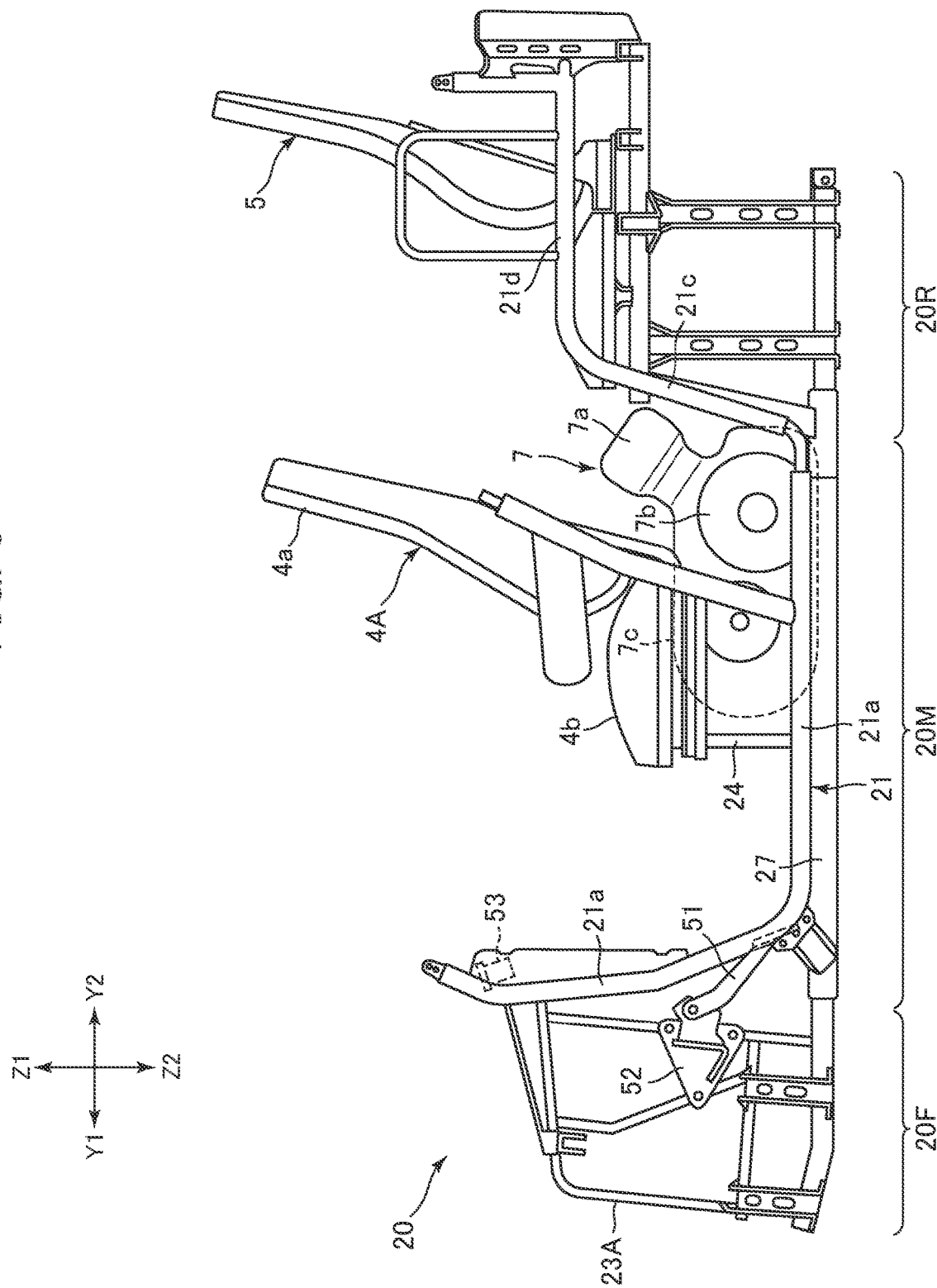
FIG. 3 is a side view of the main frame.
Figure 4:
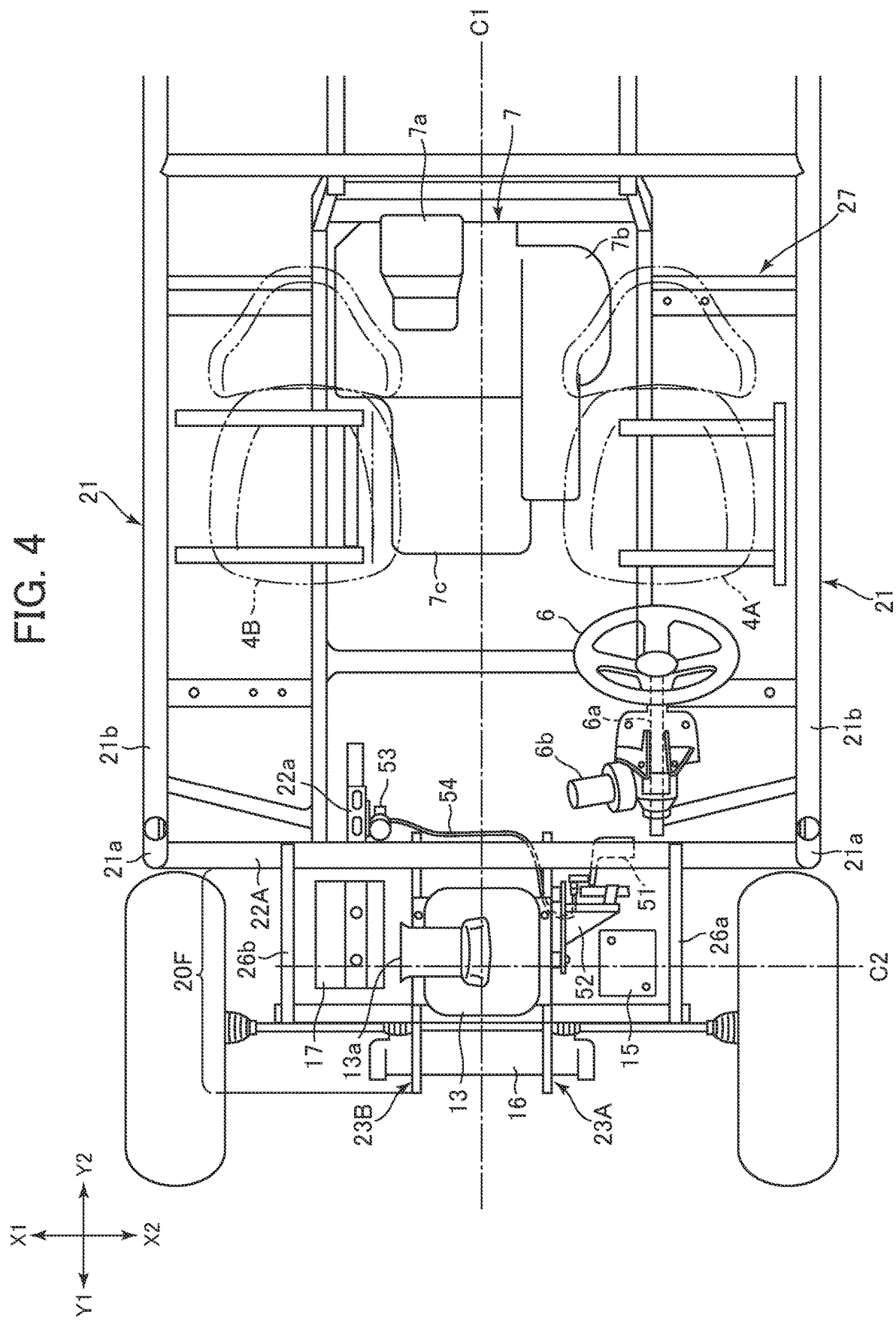
FIG. 4 is a plan view of the main frame.
Figure 5:
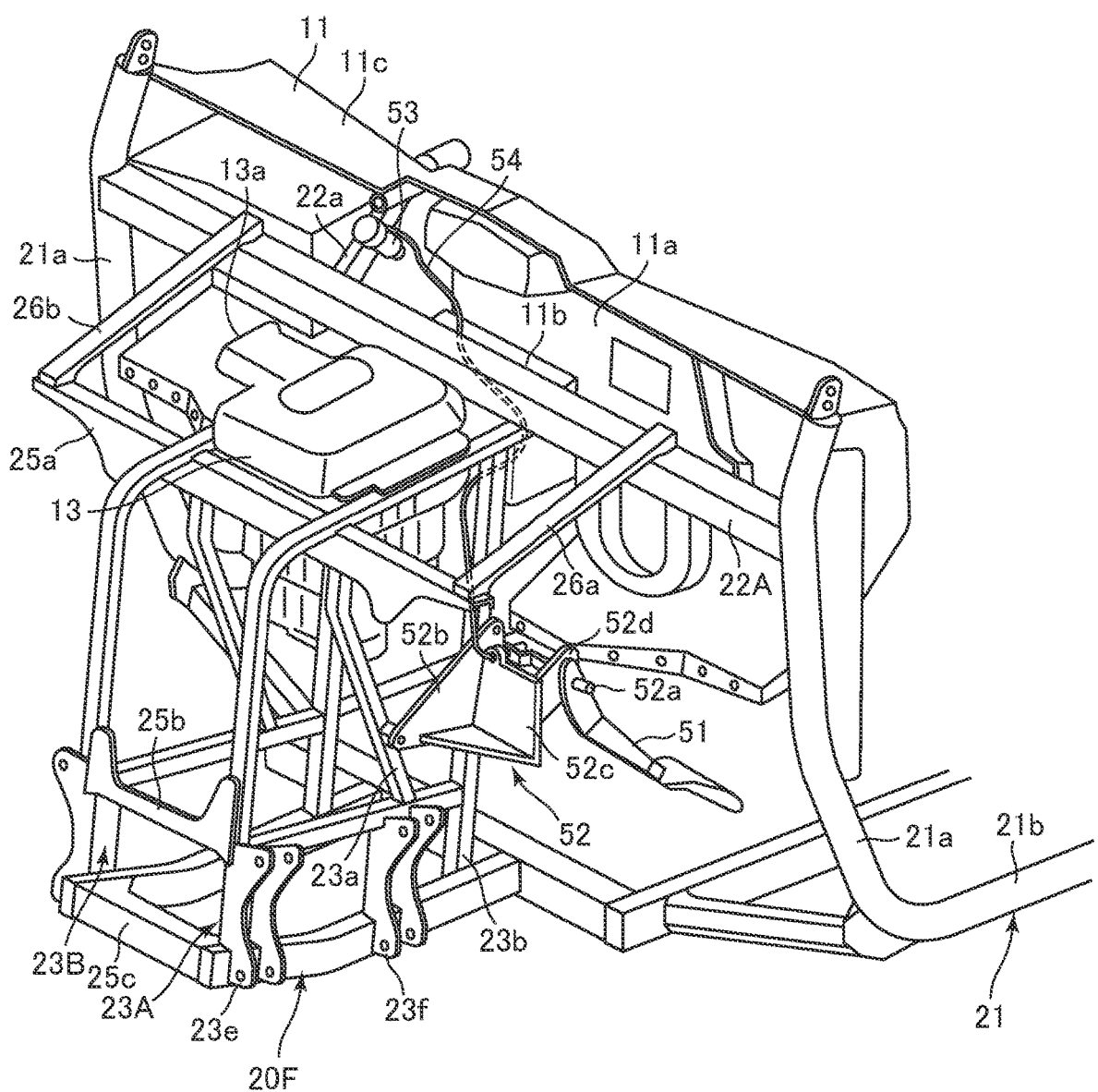
FIG. 5 is a perspective view showing a front portion of the main frame.
Figure 6:
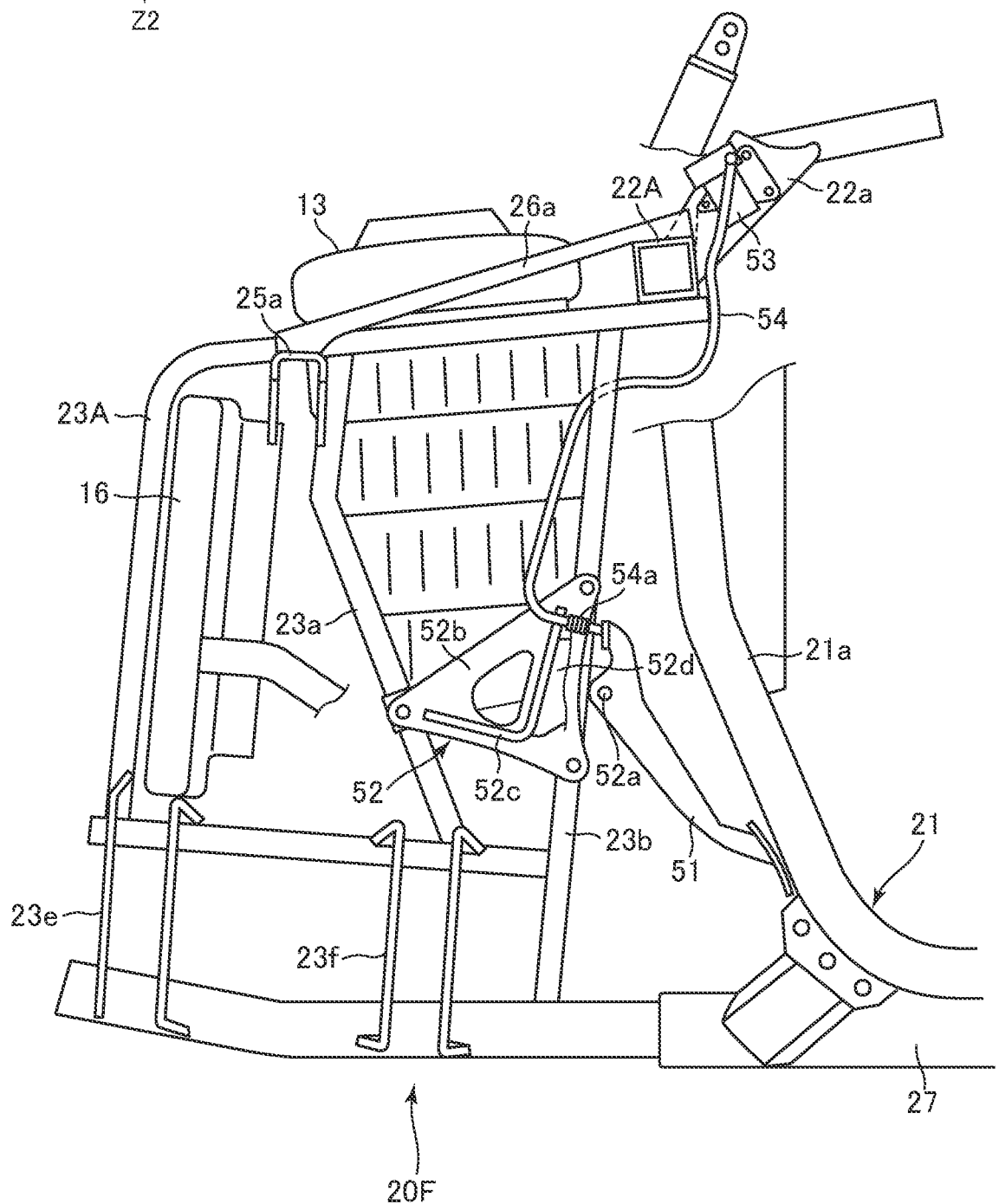
FIG. 6 is a side view showing the front portion of the main frame.
Figure 7:
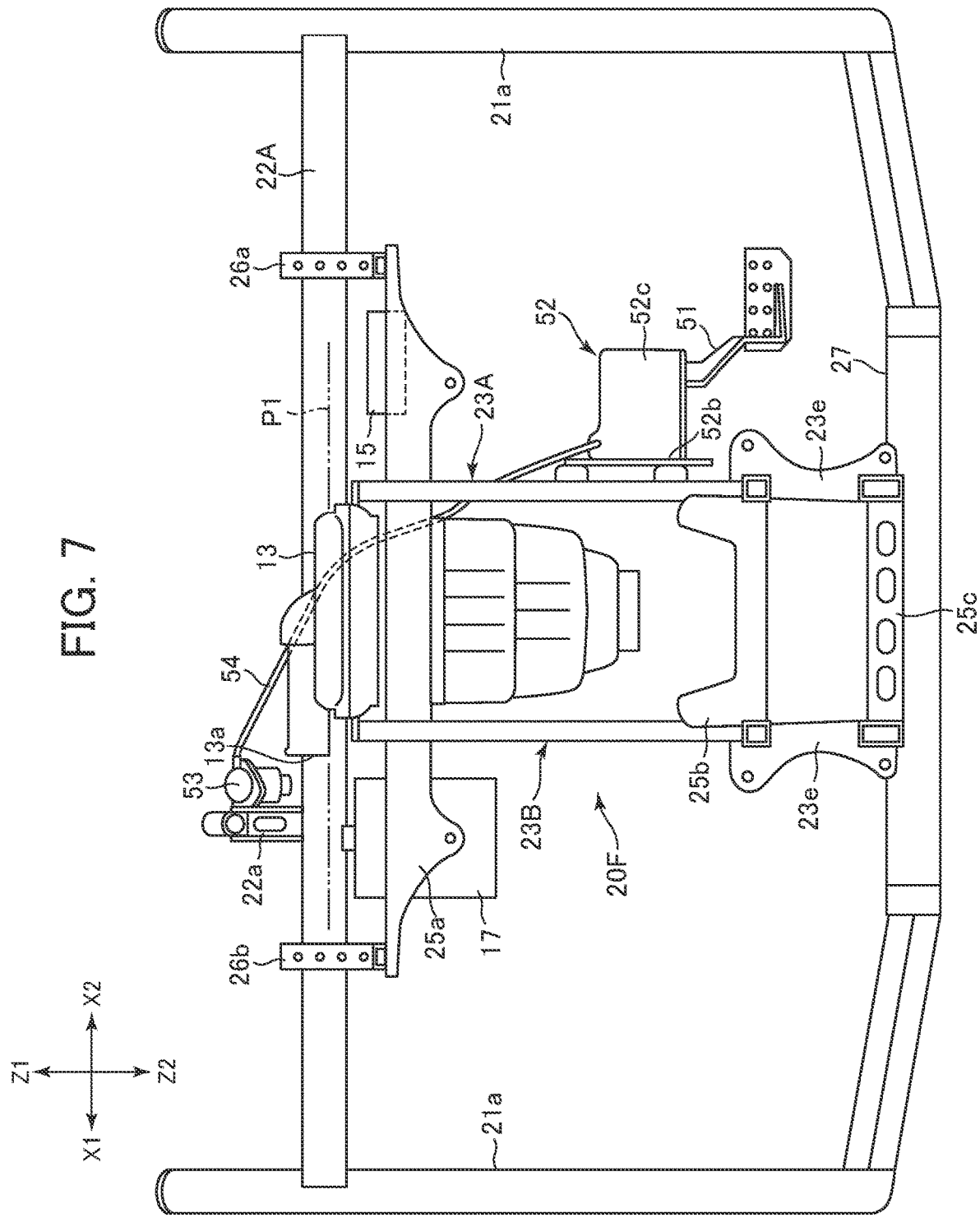
FIG. 7 is a front view showing the front portion of the main frame.

FIG. 1 is a side view of a vehicle 1 which is an example of the embodiments according to the present disclosure. FIG. 2 is a perspective view of a lower part (a main frame 20 to be described after) of the vehicle body frame FV constituting the vehicle 1. FIG. 3 is a side view of the main frame 20. FIG. 4 is a plan view of the main frame 20. FIGS. 5 to 7 are figures showing a front portion of the main frame 20. FIG. 5 is a perspective view thereof, FIG. 6 is a side view thereof, and FIG. 7 is a front view thereof. A portion of the frame are omitted in FIG. 6 so that an accelerator position sensor 53 to be described later is depicted.

In the following description, the directions indicated by Y1 and Y2 in those figures will be referred to as a "forward direction" and a "rearward direction", respectively. The directions indicated by Z1 and Z2 are referred to as an "upward direction" and a "downward direction", respectively. The directions indicated by X1 and X2 are referred to as a "rightward direction" and a "leftward direction", respectively.

The vehicle 1 is a type suitable for use on rough terrain and is referred to as an all terrain vehicle (ATV), a "Side-by-Side vehicle", an "Utility vehicle", and a "Recreational Off-Highway vehicle". As shown in FIG. 1, the vehicle 1 includes right and left front wheels 2 and right and left rear wheels 3. The vehicle 1 includes right and left front seats 4A, 4B. That is, the front seat 4A located on the left side, in an example of the vehicle 1, is a driver seat for a driver to sit on. A steering wheel 6, an accelerator pedal 51 (see FIG. 4), and the like are located forward of the driver seat 4A. The vehicle 1 may not include two front seats 4A, 4B. That is, the vehicle 1 may not include the passenger seat 4B next to the driver seat 4A. In the example of the vehicle 1, rear seats 5 (see FIG. 1) are disposed behind the front seats 4A, 4B. Alternatively, the vehicle 1 may not include the rear seats 5.

As shown in FIG. 1, the vehicle 1 includes a vehicle body frame Fv. The vehicle body frame Fv includes a lower frame 20 on which the seats 4A, 4B, and 5 and the engine unit 7 (see FIG. 3) are mounted, and an upper frame 30 covering the seats 4A, 4B, and 5. Hereinafter, the lower frame 20 will be referred to as a "main frame", and the upper frame 30 will be referred to as a "roll cage". The roll cage 30 is composed of a plurality of pipes and is connected to the main frame 20 in the vertical direction.

As shown in FIG. 3, the main frame 20 includes a frame front portion 20F located between the right and left front wheels 2. Suspensions 8 (see FIG. 1) that support the front wheels 2 and arms (not shown) that allow the front wheels 2 to move up and down are connected to the frame front portion 20F. The main frame 20 also includes a frame rear portion 20R located between the right and left rear wheels 3. Suspensions (not shown) that support the rear wheels 3 and arms (not shown) that allow the rear wheels 3 to move up and down are connected to the frame rear portion 20R. The main frame 20 includes a frame mid portion 20M located between the frame front portion 20F and the frame rear portion 20R. The engine unit 7 and the front seats 4A and 4B are mounted in the frame mid portion 20M.

As shown in FIG. 2, the frame mid portion 20M includes extending portions 21 on right and left portions of the frame mid portion 20M. Each extending portion 21 includes a raid portion 21b located at the bottom of the frame mid portion 20M and extending in the front-rear direction, a front vertical portion 21a extending obliquely upward from a front portion of the mid portion 21b, and a rear vertical portion 21c extending obliquely upward from a rear portion of the mid portion 21b. The extending portion 21 further includes a rear extending portion 21d extending rearward from the upper portion of the rear vertical portion 21c. A plurality of cross portions 22A, 22B, and 22C are bridged between the right and left extending portions 21. In the example of the vehicle 1, an accelerator position sensor 53 is mounted on the cross portion 22A that is located foremost among the plurality of cross portions 22A, 22B and 22C. The accelerator position sensor 53 will be described later.

As shown in FIG. 2, the frame mid portion 20M includes a bottom portion 27 between the right and left extending portions 21 (more specifically, between the central portions 21b). The bottom portion 27 includes a bottom panel 27a, members 27b extending in the right-left direction and attached to the bottom panel 27a, members 27c extending in the front-rear direction and attached to the bottom panel 27a, for example. As shown in FIG. 3, the engine unit 7 and the front seats 4A and 4B are mounted on the bottom portion 27. The frame mid portion 20M includes seat support portions 24 extending upward from the bottom portion 27. The front seats 4A and 4B are disposed on the upper side of the seat support portions 24.

As shown in FIG. 4, the engine unit 7 is located between the right and left front seats 4 in a plan view of the vehicle body. In the example of the vehicle 1, the engine unit 7 includes an engine 7a, including a crankcase and a cylinder in the rear portion of the engine unit 7, a case 7b of a transmission (for example, a belt-type continuously variable transmission) located on a left portion of the engine unit 7, and a case 7c of a transmission (for example, a gear type transmission) located in a front portion of the engine unit 7. As shown in FIG. 3, a portion of the engine unit 7 is located lower than the front seats 4A and 4B in a side view of the vehicle body. More specifically, the cases 7b and 7c of the engine unit 7 are located lower than seat bottoms 4b of the front seats 4A and 4B. The seat bottom 4b is a portion located in a bottom of the front seat 4A and 4B and including a seat surface on which an occupant sits. Each front seat 4A and 4B in eludes a seat back 4a located on the rear side of the seat bottom 4b. The structure of the main frame 20, shape of each portion, and the arrangement of the engine unit 7 are not limited to those in vehicle 1.

As shown in FIG. 2, the frame front portion 20F is located in front of the frame mid portion 20M. In the example of the vehicle 1, the frame front portion 20F includes a left portion 23A composed of a plurality of rods and a right portion 238 composed of a plurality of rods. Specifically, each of the left portion 23A and the right portion 23B is composed of rods extending forward from the frame mid portion 20M and rods extending in the vertical direction. In the example of the vehicle 1, a bracket 52 supporting the accelerator pedal 51 is attached to the frame front portion 20F. Specifically, the bracket 52 is attached to the left side of the left portion 23A. The frame front portion 20F includes a plurality of cross portions 25a, 25b, and 25c extending in the right-left direction and connected to the left portion 23A and the right portion 23B. The width of the frame front portion 20F in the right-left direction is smaller than the width of the frame mid portion 20M in the right-left direction. That is, the interval between the left portion 23A and the right portion 23B is smaller than the interval between the right and left extending portions 21 constituting the frame mid portion 20M. The front wheels 2 are placed on the right side and the left side of the frame front portion 20F. Arm connecting portions 23e and 23f (see FIG. 5) are formed on lateral sides of the right portion 23B and the left portion 23A to be connected to arms supporting the front wheels 2.

As shown in FIG. 3, the accelerator pedal 51 and the bracket 52 supporting the accelerator pedal 51 are located forward of the driver seat 4A. The bracket 52 supports the accelerator pedal 51 so that the accelerator pedal 51 moves by driver's stepping on the accelerator pedal 51. In detail, the bracket 52 is provided with a support shaft 52a (see FIG. 5), and the accelerator pedal 51 is movable around the support shaft 52a. The bracket 52 is a member formed separately from the vehicle body frame Fv (more specifically, from the frame front portion 20F) and attached to the vehicle body by fixing tools (for example, screws or bolts) or by welding. In the example of the vehicle 1, the bracket 52 is composed of a plurality of metal plates and is attached to the frame front portion 20F. Specifically, the bracket 52 includes a first plate 52b attached to the vertical rods 23a and 23b of the left portion 23A of the frame front portion 20F. Further, the bracket 53 includes a second, plate 52c attached to the first plate 52b and facing rearward, and a third plate 52d extending rearward from the second plate 52c. The support shaft 52a is supported by, for example, the third plate 52d (a portion of the third plate 52d is broken in FIG. 6). The structure and the shape of the bracket 52 are not limited to the example of the vehicle 1.

As shown in FIG. 5, the vehicle 1 includes an accelerator position sensor 53 that detects the amount of deflection of the accelerator pedal 51 (hereinafter the accelerator position sensor is denoted as APS"). The APS 53 is mechanically connected to the accelerator pedal 51 via a wire 54. That is, one end of the wire 54 is connected to the upper portion of the accelerator pedal 51, and the other end thereof is connected to a movable portion of the APS 53. When the accelerator pedal 51 is stepped on by the driver, rotating the accelerator pedal 51 around the support shaft 52a, the wire 54 pulls the movable portion of the APS 53 in response to the movement of the accelerator pedal 51. The wire 54 may include, on an end thereof, an adjustment screw 54a (see FIG. 6) for adjusting a degree or movement of the accelerator pedal 51. The APS 53 outputs an electric signal corresponding to an amount of deflection (that is, the position of the movable portion) of the accelerator pedal 51. The APS 53 is electrically connected to the engine control unit 15 (see FIG. 4) through an electric cable (hereinafter, the engine control unit is referred to as an "ECU"). The electric signal of the APS 53 is input to the ECU 15, and the ECU 15 controls the engine 7a based on the amount of deflection of the accelerator pedal 51.

As shown in FIG. 6, the APS 53 is located higher than the bracket 52. That is, in a side view of the vehicle body, the APS 53 is located upward and away from the bracket 52. This arrangement prevents the APS 53 from being splashed with water or mud, even when the vehicle 1 is operated in a place where mud or water splash on the bracket 52 and the accelerator pedal 51. In the example of the vehicle 1, the APS 53 is located forward of the front seats 4A and 4B in a side view of the vehicle body, like the accelerator pedal 51. This arrangement can prevent the wire 54 connecting the APS 53 and the accelerator pedal 51, from being excessively long.

As shown in FIG. 3, the APS 53 is located higher than the lower surface of the driver seat 4A in a side view of the vehicle body. This arrangement can prevent the APS 53 being splashed with water, for example, even when a lower portion of the vehicle body (more specifically, a portion lower than the seat 4A) is immersed in water. In the example of the vehicle 1, the APS 53 is located higher than the upper surface (seat surface) of the seat bottom 4b of the driver seat 4A. As described above, the engine unit 7 in the example of the vehicle 1 is located between the driver seat 4A and the passenger seat 4B, and is located lower than the seats 4A and 4B. Therefore, the APS 53 is located higher than the lower end of the engine unit 7. In detail, the APS 53 is located higher than the upper surfaces of the cases 7c and 7b and the upper surface of the crankcase.

As shown in FIG. 5, a dashboard 11 is dispensed forward of the seats 4A and 4B. Various instruments such as a speedometer and a tachometer are attached to the dashboard 11, for example. A display device for displaying vehicle speed and engine speed may be attached to the dashboard 11. The dashboard 11 includes a rear panel portion 11a including a rear surface facing the seats 4A and 4B and to which meters or a display device are attached, and a lower panel portion 11b extending forward from the rear panel portion 11a. In the example of the vehicle 1, the lower panel portion 11b extends forward from the lower of the rear panel portion 11a. As shown in FIG. 5, the APS 53 is located in front of the rear panel portion 11a and above the lower panel portion 11b. In other words, the lower panel portion 11b is located under the APS 53, and thus in a plan view of the vehicle body, the APS 53 and the lower panel portion 11b overlap each other. In this arrangement, the lower panel portion 11b can prevent mud and water from being splashed onto the APS 53. Unlike the example in the vehicle 1, the panel located under the APS 53 may not be a portion of the dashboard 11. For example, a dedicated panel for preventing mud and water from being splashed onto the APS 53 may be disposed under the APS 53.

As shown in FIG. 1, the vehicle 1 includes a front cover 12 covering the upper sides of the front wheels 2 and the frame front portion 20F as an exterior member of the vehicle 1. The APS 53 is disposed under the front, cover 12. As shown in FIG. 5, the dashboard 11 includes an upper panel portion 11c extending forward from the upper edge of the rear panel portion 11a. The APS 53 may be disposed under the upper panel portion 11c.

The vehicle 1 includes an induction system that includes an air intake for intaking the atmospheric air, and supplies the atmospheric air intaken through the air intake to the engine 7a. The APS 53 is preferably located higher than the air intake. This more reliably prevents the APS 53 from being splashed with mud and water. As shown in FIG. 7, in the example of the vehicle 1, the induction system includes an air cleaner 13 accommodating a filter for purifying atmospheric air. The air cleaner 13 includes an air intake 13a that inhales atmospheric air. The air cleaner 13 is connected to the engine 7a through a duct (not shown), and supplies the atmospheric air inhaled through the air intake 13a to the engine 7a. The APS 53 is located higher than the air intake 13a. In the example of the vehicle 1, the APS 53 is located higher than the horizontal plane P1 passing through the lower end of the air intake 13a.

In the example of the vehicle 1, the air cleaner 13 has a vertically elongated box shape and includes the air intake (opening end) 13a at the top thereof. The air intake 13a opens to the right. The air cleaner 13 is located between the right portion 23B and the left portion 23A of the frame front portion 20F and is supported thereby. As shown in FIG. 5, the APS 53 is located further rearward than the air cleaner 13. The wire 54 extends downward to the accelerator pedal 51 through a path that is defined on the rear side of the air cleaner 13 and on the front side of the lower panel portion 11b of the dashboard 11.

The layout of the APS 53 and the air cleaner 13 is not limited to the example of the vehicle 1. For example, the APS 53 may be located at the same height as the air intake 13a. That is, the APS 53 may cross the horizontal plane P1 passing through the lower end of the air intake 13a. In yet another example, the induction system may include a duct fixed to the air cleaner 13 and connecting the air cleaner 13 and an air intake (opening end). In this example, the APS 53 may be located higher than the air intake which is the end portion of the duct. In yet another example, the air cleaner 13 may be disposed at a rear portion of the vehicle body. In this example, the APS 53 is preferably located higher than the air intake. In yet another example, the air intake 13a stay open upwards, forwards, or leftwards.

As described above, a steering wheel 6 for steering the front wheels 2 is disposed in front of the driver seat 4A. The steering wheel 6 is fixed on the upper portion of the steering column 6a that extends obliquely downward from the steering wheel 6. As shown in FIG. 4, the steering column 6a in the example of the vehicle 1 is provided with an electric motor 6b that assists a steering force of a driver (force that rotates the steering wheel 6). That is, the vehicle 1 has a steering assist system.

As described above, similarly to the steering wheel 6, the APS 53 is located forward of the driver seat 4A in a side view of the vehicle body. As shown in FIG. 4, the APS 53 and the electric motor 6b are arranged apart from each other in the right-left direction. In detail, the APS 53 is located on an opposite side to the electric motor 6b across the center C1 in the right-left direction or the vehicle body. In other words, the APS 53 is located on an opposite side to the steering wheel 6 across the center C1 in the right-left direction of the vehicle body. This arrangement can ensure a sufficient distance between the electric motor 6b and the APS 53 and consequently reduces the influence on the APS 53 from the magnetic field formed by the electric motor 6b.

An electric motor different from the electric motor for assisting steering force may be disposed in front of the seats 4A and 4B. In this vehicle, the APS 53 may be arranged on the side opposite to the electric motor across the center C1 in the right-left direction of the vehicle.

As described above, the vehicle 1 includes an ECU 15 that controls the engine 7a based on an output signal of the APS 53. As shown in FIG. 4, both the APS 53 and the ECU 15 are disposed on the front portion of the vehicle body and are located between right and left front wheels 2, in a plan view of the vehicle body. This layout can reduce the distance between the APS 53 and the ECU 15, and consequently shortens the electrical cable connecting them. In the example of the vehicle 1, the APS 53 is disposed on a side opposite to the ECO 15 across the center C1 in the right-left direction of the vehicle body. Unlike the example of the vehicle 1, the APS 53 and the ECU 15 may be disposed on the same side of the center C1.

As shown in FIG. 4, the vehicle 1 includes a battery 17 in the front portion thereof for supplying electric power to various electrical components. In the example of the vehicle 1, the battery 17 is disposed on a side opposite to the ECU 15 across the air cleaner 13. The APS 53 is located behind the battery 17 in a plan view of the vehicle body.

As shown in FIG. 7, the ECU 15 is mounted on the upper portion of the frame front portion 20F. The APS 53 is located higher than the ECU 15. In this layout, since both the APS 53 and the ECU 15 are located at a high position, an electric cable connecting the APS 53 and the ECU 15 can be located at a high position and can have a shortened length. The layout of the ECU 15 and the APS 53 is not limited to the example of the vehicle 1. For example, the ECU 15 and the APS 53 may be located at the substantially same height. In other words, the APS 53 may intersect the horizontal plane that passes through the ECU 15.

As shown in FIG. 5, the frame front portion 20F includes a cross portion 25a fixed to the upper portion of the left portion 23A and the right portion 23B. Rods 26a and 26b extend in the front-rear direction to be bridged between the cross portion 22A of the frame mid portion 20M and both two ends of the cross portion 25a. The ECU 15 is supported by, for example, the rod 26a, the cross portion 25a, and the left portion 23A. In the example of the vehicle 1, the ECU 15 is located lower than the cross portion 22A of the frame mid portion 20M. On the other hand, the APS 53 is located higher than the cross portion 22A of the frame mid portion 20M (see FIG. 7). The support structure of the APS 53 will be described later on in detail.

As shown in FIG. 4, the vehicle 1 includes, in the front portion of the vehicle, a radiator 16 that cools liquid coolant of the engine 7a. The radiator 16 includes a fan (not shown) and an electric motor for driving the fan. The APS 53 is located further rearward than the radiator 16. In the example of the vehicle 1, the radiator 16 is disposed forward of the center C2 in the front-rear direction of the frame front portion 20F, and the APS 53 is disposed rearward of the center C2. This layout can secure a sufficient distance between the radiator 16 and the APS 53, and consequently reduces the influence on the APS 53 from the magnetic field formed by the electric motor of the radiator 16.

In the example of the vehicle 1, the radiator 16 is located further forward than the air cleaner 13, the battery 17, and the ECU 15. The APS 53 is located further rearward than the air cleaner 13, the battery 17, and the ECU 15. The layout of the APS 53, the radiator 10, the battery 17, and the ECU 15 is not limited to the example of the vehicle 1. For example, the APS 53 may be disposed on the lateral side of the battery 17 and the ECU 15 in a plan view of the vehicle body.

As described above, in the example of the vehicle 1, the APS 53 is disposed on an opposite side across the center C1 to the electric motor 6b that assists the rotation of the steering wheel 6. Accordingly, the APS 53 is located away from both the electric motor 6b and the electric motor of the radiator 16.

As described above, the APS 53 is supported by the main frame 20. In the example of the vehicle 1, the APS 53 is supported by a portion located further rearward than the frame front portion 20F. Specifically, the APS 53 is supported by the cross portion 22A of the frame mid portion 20M. A bracket 22a is attached to the cross portion 22A, and the APS 53 is attached to the bracket 22a. The bracket 22a extends obliquely rearward and upward from the cross portion 22A. This structure heightens the position of the APS 53. The arrangement is not limited to the example of the vehicle 1. For example, the APS 53 may be attached to the cross portion 22A itself, or may be alternatively attached to an upper portion of the extending portion 21 of the frame mid portion 20M (for example, attached to an upper portion of the front vertical portion 21a). In yet another example, the APS 53 may be supported by the top of the frame front portion 20F.

As described above, the APS 53 in the example of the vehicle 1 is located higher than the bracket 52. That is, in the side view of the vehicle body, the APS 53 is located upward away from the bracket 52. This arrangement can prevent the APS 53 from being splashed with mud and water.

The present invention is not limited to the above-described embodiment. It is obvious to those skilled in the art that there are other embodiments that can obtain similar functions and effects. The other embodiments that are substantially equivalent to the above-described embodiment are within the scope of the claims.

What is claimed is:

1. A vehicle comprising:
    right and left front wheels;
    right and left rear wheels;
    a driver seat for a driver to sit on;
    an accelerator pedal located forward of the driver seat;
    a bracket supporting the accelerator pedal configured so that the accelerator pedal is movable by stepping on the accelerator pedal;
    an accelerator position sensor that detects an amount of deflection of the accelerator pedal, an entirety of the accelerator position sensor being located higher than the accelerator pedal; and
    a wire directly connecting the accelerator pedal and the accelerator position sensor to each other.

2. The vehicle according to claim 1, wherein the accelerator position sensor is located higher than a lower surface of the driver seat.

3. The vehicle according to claim 1, wherein the accelerator position sensor is located forward of the driver seat.

4. The vehicle according to claim 3, further comprising a plate member located under the accelerator position sensor.

5. The vehicle according to claim 1, further comprising an engine, wherein the accelerator position sensor is located higher than a lower end of the engine.

6. The vehicle according to claim 1, further comprising a controller that controls an engine, wherein the accelerator position sensor and the controller are located between the right and left front wheels.

7. The vehicle according to claim 1, further comprising a front cover located between the right and left front wheels and covering an upper side of the vehicle, wherein the accelerator position sensor is located under the front cover.

8. The vehicle according to claim 1, further comprising an induction system that includes an air intake that intakes the atmospheric air, and carries the intaken atmospheric air to an engine, wherein the accelerator position sensor is located at the same height, or higher, than the air intake.

9. The vehicle according to claim 1, further comprising an electric motor located further forward than the driver seat in a side view of the vehicle, wherein the accelerator position sensor is located on an opposite side to the electric motor across a center of the vehicle in a right-left direction.

10. The vehicle according to claim 1, further comprising a radiator disposed in a front portion of the vehicle, wherein the accelerator position sensor is located further rearward than the radiator.

11. The vehicle according to claim 1, further comprising a roll cage covering the driver seat.

12. The vehicle according to claim 1, further comprising an engine, wherein the driver seat comprises a seat bottom including a seat surface facing upward, and at least a portion of the engine is located lower than the seat bottom.

13. The vehicle according to claim 1, further comprising an engine, wherein the engine is located between the driver seat and a passenger seat, the passenger seat located next to the driver seat.

14. The vehicle according to claim 1, wherein one end of the wire is connected to an upper portion of the accelerator pedal and another end of the wire is connected to the accelerator position sensor.

15. A vehicle comprising:
    right and left front wheels;
    right and left rear wheels;
    a driver seat for a driver to sit on;
    an accelerator pedal located forward of the driver seat;
    a bracket supporting the accelerator pedal configured so that the accelerator pedal is movable by stepping on the accelerator pedal;
    an accelerator position sensor that is located higher than the bracket and forward of the driver seat, and detects an amount of deflection of the accelerator pedal;

a wire connecting the accelerator pedal and the accelerator position sensor to each other;
a plate member located under the accelerator position sensor, and
a dashboard located forward of the driver seat, wherein the plate member is a portion of the dashboard.

16. A vehicle comprising:
right and left front wheels;
right and left rear wheels;
a driver seat for a driver to sit on;
an accelerator pedal located forward of the driver seat;
a bracket supporting the accelerator pedal configured so that the accelerator pedal is movable by stepping on the accelerator pedal;
an accelerator position sensor that is located higher than the bracket, and detects an amount of deflection of the accelerator pedal; and
a wire connecting the accelerator pedal and the accelerator position sensor to each other,
wherein the accelerator position sensor is located on an opposite side to a steering wheel across a center of the vehicle in a right-left direction.

17. A vehicle comprising:
right and left front wheels;
right and left rear wheels;
a driver seat for a driver to sit on;
an accelerator pedal located forward of the driver seat;
a bracket directly supporting the accelerator pedal configured so that the accelerator pedal is movable by stepping on the accelerator pedal;
an accelerator position sensor that detects an amount of deflection of the accelerator pedal, an entirety of the accelerator position sensor being located higher than the accelerator pedal; and
a wire connecting the accelerator pedal and the accelerator position sensor to each other.

* * * * *